United States Patent
Allaei

(10) Patent No.: US 7,811,048 B2
(45) Date of Patent: Oct. 12, 2010

(54) TURBINE-INTAKE TOWER FOR WIND ENERGY CONVERSION SYSTEMS

(75) Inventor: Daryoush Allaei, Minnetonka, MN (US)

(73) Assignee: Quality Research, Development & Consulting, Inc., Chaska, MN (US)

( * ) Notice: Subject to any disclaimer, the term of this patent is extended or adjusted under 35 U.S.C. 154(b) by 0 days.

(21) Appl. No.: 12/369,949

(22) Filed: Feb. 12, 2009

(65) Prior Publication Data

US 2010/0133847 A1 Jun. 3, 2010

(51) Int. Cl.
*F03D 7/04* (2006.01)
*F03D 11/04* (2006.01)

(52) U.S. Cl. .............................. 415/1; 415/4.3; 415/4.5; 415/7; 415/13; 415/42; 415/48; 415/49; 415/50; 415/145; 416/85

(58) Field of Classification Search .................. 415/2.1, 415/4.1–4.5, 144–145, 905, 907, 908, 1, 415/7, 13, 26, 28–30, 36, 42, 47–50, 10; 416/85
See application file for complete search history.

(56) References Cited

U.S. PATENT DOCUMENTS

| | | | | | |
|---|---|---|---|---|---|
| 84,237 | A | * | 11/1868 | Waite | .......................... 415/4.3 |
| 299,127 | A | * | 5/1884 | Garrigus | ...................... 415/2.1 |
| 1,345,022 | A | * | 6/1920 | Oliver | ........................ 415/4.3 |
| 1,496,767 | A | * | 6/1924 | Bonetto | ....................... 415/2.1 |
| 2,616,506 | A | * | 11/1952 | Mathias | ....................... 415/2.1 |
| 4,406,579 | A | * | 9/1983 | Gilson | ......................... 415/2.1 |
| 6,688,841 | B1 | * | 2/2004 | Wobben | ......................... 415/1 |
| 6,979,171 | B2 | * | 12/2005 | Lauritsen | ..................... 415/4.3 |
| 2009/0087301 | A1 | * | 4/2009 | Krouse | ........................ 415/4.3 |

OTHER PUBLICATIONS www.autobloggreen.com/photos/rormaxx/1263571, "RORMaxx Automotive", Jan. 6, 2009, pp. 2.

* cited by examiner

*Primary Examiner*—Christopher Verdier
(74) *Attorney, Agent, or Firm*—Leffert Jay & Polglaze, P.A.

(57) ABSTRACT

A turbine-intake tower for delivering wind to a turbine has a hollow support column, an intake nozzle assembly rotatably coupled to the support column, and a tower nozzle disposed within the support column. The intake nozzle assembly is configured to receive and to accelerate wind. The tower nozzle is configured to receive the wind from the intake nozzle assembly and to further accelerate the wind received from the intake nozzle assembly for delivery to the turbine.

20 Claims, 6 Drawing Sheets

TURBINE-INTAKE TOWER FOR WIND ENERGY CONVERSION SYSTEMS

FIELD

The present disclosure relates generally to wind energy conversion and, in particular, the present disclosure relates to turbine-intake towers for wind energy conversion systems.

BACKGROUND

Due to the recent energy problems that have arisen, considerable interest has been given to wind power to be converted efficiently into electrical energy. Most of the developments and advancements have been focused on the improvement of the aerodynamics of propeller-type turbines, e.g., known as wind turbines and initially referred to as windmills. Typically, each turbine-generator system is mounted on the top of a tall tower, where the taller the tower, the higher the prevailing wind speed. The electrical power generated from a wind turbine is proportional to cubic order of the wind speed. Furthermore, the longer each turbine blade, the higher the power generation is. However, long blades are costly, can be subjected to defects and failure, take up a large amount of space, and generate excessive noise and vibration. The electrical power generated from a wind turbine is directly proportional to the square of the propeller length. However, taller towers and longer propellers increase not only the cost of material and installation, but also the cost of maintenance.

The current wind power generation systems typically suffer from low efficiency, high capital cost, unpredictable failures, excessively high noise and vibration, and/or high maintenance. Due to higher wind speed, large wind farms have recently been installed at sea. These sea-based systems suffer from even much higher capital and maintenance costs. Therefore, the growth of wind farms has been slow at best.

One of the national goals is that wind energy must provide 20% of the nation's electricity by the year 2030. This level of wind power will support 500,000 jobs while saving the consumers $128 billion by lowering the price of natural gas. In addition, it will cut greenhouse gas emission that is equivalent to taking 140,000,000 cars off the road. While no breakthrough in wind power technology is needed to achieve this goal, power transmission lines, reliability, reduction of operation and maintenance costs, and reduction of downtime and failure of wind turbines is crucial.

The operational and maintenance costs of wind turbines should be reduced to make conversion of wind energy to electrical power economically more viable. The wind turbines must also become more reliable with reduced downtime and failures. For example, for offshore wind turbines, the costs for operation and maintenance are estimated in the order of 30 to 35% of the costs of electricity. Roughly 25% to 35% is related to preventive maintenance while 65% to 75% is due to corrective maintenance.

Wind turbines are complex machines with several submachines that convert the kinetic energy of moving air to electrical power. Extraction of a significant amount of energy requires high wind speeds and large turbine diameters. In general, turbine speeds are slow (about 20 rpm) and the speed must be increased to a useful generator speed. A typical wind machine has a 3-blade turbine of more than 60 meters in diameter. This turbine drives a generator through a speed-increasing gearbox that generally has a planetary first stage and one or two additional parallel shaft stages. The generator runs at about 1500 rpm and produces about 1.5 MW. Many wind turbines are variable speed machines; the speed depends on the wind conditions and can vary over a wide range. For these machines, high power output requires high levels of torque and accompanying high gear-mesh forces. Because of the low speed of the turbine, the various gearbox components are usually supported by rolling element bearings. These bearings are subject to significant radial loads and need to be carefully monitored to detect any degradation.

At present, with the increasing installed power of the wind turbines, the application of offshore wind turbines, and major problems with turbine blades and gearboxes, the necessity of condition monitoring can no longer be neglected. Some components, although designed for the turbine lifetime, may require repair or fail earlier than expected. This is emphasized by the approach of warranty and insurance companies that simply require application of monitoring provisions. Otherwise, expensive preventive replacements or inspections should be carried out periodically.

For the reasons stated above, and for other reasons stated below which will become apparent to those skilled in the art upon reading and understanding the present specification, there is a need in the art for alternatives to existing wind power generation systems.

SUMMARY

An embodiment of the present invention provides a turbine-intake tower for delivering wind to a turbine. The turbine-intake tower has a hollow support column, an intake nozzle assembly rotatably coupled to the support column, and a tower nozzle disposed within the support column. The intake nozzle assembly is configured to receive and to accelerate wind. The tower nozzle is configured to receive the wind from the intake nozzle assembly and to further accelerate the wind received from the intake nozzle assembly for delivery to the turbine.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
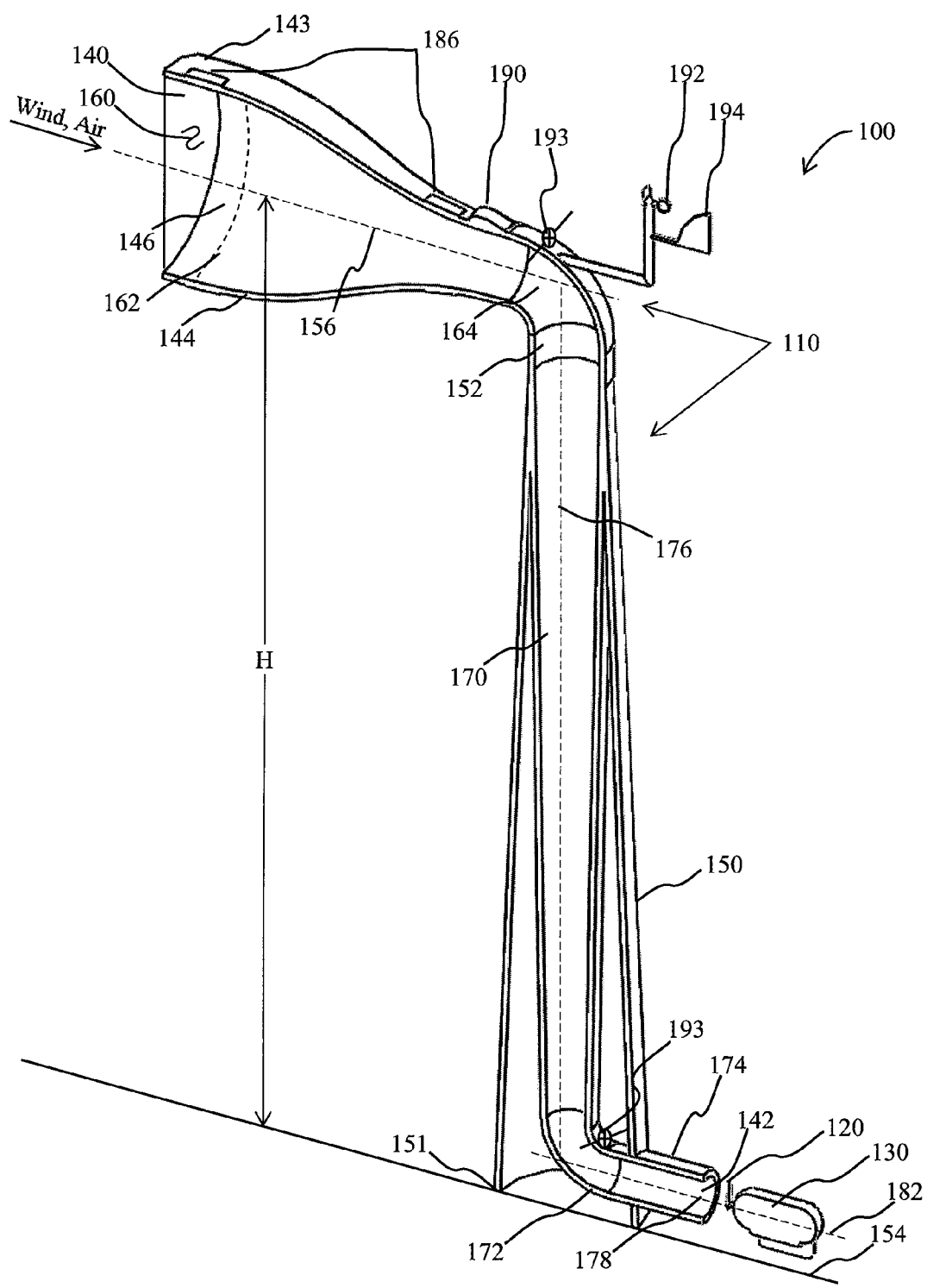
FIG. 1 is a cut-away perspective view of an embodiment of a wind energy conversion system, according to an embodiment of the present invention.

FIG. 1 is a cut-away perspective view of a wind energy conversion system 100. Wind energy conversion system 100 includes a turbine-intake tower 110, a turbine 120 fluidly coupled to turbine-intake tower 110, and an electrical generator 130, such as a 60 Hz AC generator, coupled (e.g., mechanically coupled) to turbine 120.

Figure 2:
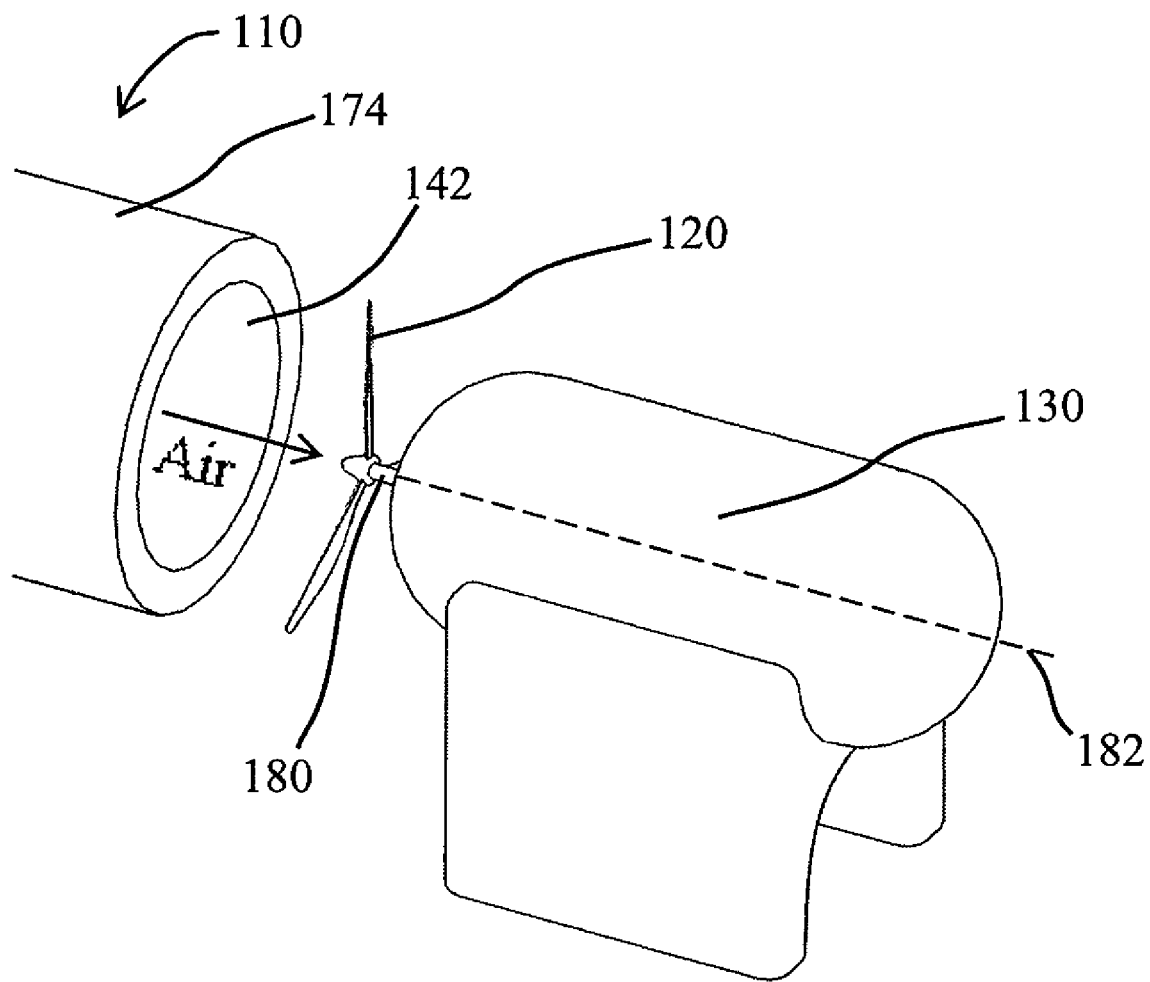
FIG. 2 is an enlarged view of a portion of FIG. 1, according to another embodiment of the present invention.

Turbine-intake tower 110 has an inlet 140 and an outlet 142. Air enters turbine-intake tower 110 through inlet 140 and flows through turbine-intake tower 110 and exits turbine-intake tower 110 through outlet 142. The air exiting though outlet 142 passes over the blades of turbine 120, as shown in FIG. 2, an enlarged view of outlet 142, turbine 120, and generator 130, causing turbine 120 to rotate. Rotation of turbine 120 rotates the generator 130 via a suitable transmission (not shown) that couples turbine 120 to generator 130.

Inlet 140 may have a screen or other devices to prevent the entry of birds or other airborne objects. Any conventional bird catcher device may be used in this system.

Turbine-intake tower 110 includes an intake nozzle assembly 143 that includes a converging intake nozzle 144 and that may include an integral collector 146 that is contiguous with converging intake nozzle 144. Intake nozzle assembly 143 is rotatably coupled to a support column 150 of turbine-intake tower 110 by means of a bearing 152. Support column 150 is substantially vertical and acts to support intake nozzle assembly 143 at a vertical height H above ground level 154, where the height H is measured from a central longitudinal axis 156 of intake nozzle assembly 143. The height H may be about the same height as the hub of a turbine of a conventional wind turbine system, where the turbine is mounted atop a tower. For example the height H may be about 100 to about 200 feet.

Support column 150 has a base 151 that may directly contact the ground at ground level 154. Alternatively, intake tower 110 may be positioned on and may be in direct contact with a platform floating on water, for example, for offshore application, and in which case ground level 154 would correspond to the surface of the platform. Turbine 120 and generator 130 are located at or near ground level, e.g., at about the same vertical level as base 151 and about the same vertical level as outlet 142, as shown in FIGS. 1 and 2.

Intake nozzle assembly 143 may be substantially horizontal. That is, central longitudinal axis 156 of intake nozzle assembly 143 may be substantially horizontal. Central longitudinal axis 156 may be substantially parallel to the direction of the wind and thus the direction of the air entering intake nozzle assembly 143. The inner surfaces of nozzle assembly 143 are made of a smooth material in order to reduce losses due to surface friction.

Collector 146 extends in the direction of central longitudinal axis 156 from an inlet plane 160 of turbine-intake tower 110 to the dashed line 162, which marks the exit of collector 146. The flow passage within collector 146 is substantially uniform in size between inlet plane 160 and the exit 162 of collector 146, i.e., the cross-sectional area (perpendicular to the flow direction) of the flow passage within collector 146 is substantially uniform between inlet plane 160 and the exit 162. When inlet 140 is facing the wind and central longitudinal axis 156 is substantially parallel to the wind direction, collector 146 collects the wind.

Intake nozzle 144 is fluidly coupled to collector 146. The flow passage within intake nozzle 144 converges (e.g., tapers) in the direction of central longitudinal axis 156, starting at the exit 162 of collector 146 and ending at an entrance to an elbow 164. That is, the cross-sectional area (perpendicular to the flow direction) of the flow passage within intake nozzle 144 decreases between exit 162 of collector 146 and elbow 164, as shown in FIG. 1. Intake nozzle 144 acts to increase the flow velocity between exit 162 of collector 146 and elbow 162. That is, passing the flow through intake nozzle 144 causes the flow to converge and thus accelerate. Note that intake nozzle 144 receives the wind from collector 146 and accelerates the wind.

Elbow 164 is interposed between intake nozzle assembly 143 and bearing 152. As such, bearing 152 rotatably connects an upper end of support column 150 to elbow 164.

Support column 150 is hollow. A converging tower nozzle 170 (e.g., a column nozzle) is located within an interior of support column 150 and may extend from bearing 152 to an elbow 172 that is coupled to an outlet duct 174 (e.g., sometimes referred to as the turbine inlet duct) that leads to outlet 142. As such, tower nozzle 170 is fluidly coupled to intake nozzle 144 and outlet duct 174.

Tower nozzle 170 may be substantially vertical. For example, a central longitudinal axis 176 of tower nozzle 170 is substantially vertical and is substantially perpendicular to central longitudinal axis 156 of intake nozzle assembly 143, as shown in FIG. 1.

The flow passage within tower nozzle 170 converges (e.g., tapers) in the direction of central longitudinal axis 176, e.g., in the downward vertical direction, starting at the exit of elbow 164 and ending at an entrance to elbow 172. That is, the cross-sectional area (perpendicular to the flow direction) of the flow passage within tower nozzle 170 decreases between elbow 164 and elbow 172, as shown in FIG. 1. Tower nozzle 170 acts to increase the flow velocity between elbow 164 and elbow 172. That is, passing the flow through tower nozzle 170 causes the flow to converge and thus accelerate.

Outlet duct 174 is substantially horizontal. For example, a central longitudinal axis 178 of outlet duct 174 is substantially horizontal and is substantially perpendicular to central longitudinal axis 176 of tower nozzle 170 and substantially parallel to central longitudinal axis 156 of intake nozzle assembly 143, as shown in FIG. 1. Elbow 172 and outlet duct 174 direct the flow from tower nozzle 170 onto the blades of turbine 120. The flow velocity at outlet 142, i.e., the outlet of turbine-intake tower 110 and of duct 174, is the turbine inlet velocity.

Turbine 120 has a shaft 180 that is substantially horizontal, i.e., shaft 180 has a central longitudinal axis 182 that is substantially horizontal and that is substantially parallel to central longitudinal axis 178 of outlet duct 174. For example, turbine 120 may be referred to as a horizontal-axis turbine. Central longitudinal axis 178 of outlet duct 174 central longitudinal axis 182 of shaft 180 may be substantially collinear. Note that for this embodiment, turbine-intake tower 110 has a substantially horizontal outlet.

Alternatively, for another embodiment, elbow 172 and outlet duct 174 may be removed, and a turbine 120 may be located at the exit of tower nozzle 170 so that its shaft 180 is substantially vertical. For example, central longitudinal axis 182 of shaft 180 is substantially vertical and is substantially parallel and substantially collinear to central longitudinal axis 176 of tower nozzle 170. In this embodiment, turbine 120 may be referred to as a vertical-axis turbine. Note that the flow velocity at the exit of tower nozzle 170 is the turbine inlet velocity for this embodiment and that turbine 120 receives the fluid flow directly from tower nozzle 170. As such, the exit of tower nozzle 170 is the outlet of turbine-intake tower 110, meaning that turbine-intake tower 110 has a substantially vertical outlet.

Elbow 164 has a radius of curvature that acts to keep flow losses relatively low. This means that the flow velocity at the exit of intake nozzle 144 and the entrance to tower nozzle 170 is substantially the same. Elbow 172 also has a radius of curvature that acts to keep flow losses relatively low. In addition, the losses in outlet duct 174 are relatively small. Therefore, the flow velocity at the exit of tower nozzle 170 and the exit of outlet duct 174 are substantially the same. As such, intake nozzle 144 and tower nozzle 170 work together to increase the flow velocity from the velocity at inlet 140 (the wind velocity) to the velocity at outlet 142 (the turbine inlet velocity). Note that the inner surfaces of the elbows, tower nozzle 170, and outlet duct 174 are made of a smooth material in order to reduce losses due to surface friction. Turbulence suppressors may be implemented to reduce turbulence in elbows 164 and 172, intake nozzle assembly 143, tower nozzle 170, and outlet duct 174 that may result from imperfections and anomalies in elbows 164 and 172, intake nozzle assembly 143, tower nozzle 170, and outlet duct 174.

Note that the flow (wind) velocity at inlet 140 is substantially the same as the flow (wind) velocity at the inlet of a wind turbine of a conventional wind turbine system. This means that the flow velocity at the inlet to turbine 120 is higher than the flow velocity (the wind velocity) at the inlet of the wind turbine of the conventional system, owing to increasing the flow velocity using intake nozzle 144 and tower nozzle 170. The increased velocity at the inlet to turbine 120 allows for shorter turbine blades compared to conventional wind turbines.

For example, the power output of a turbine is proportional to the cubic order of the turbine inlet velocity and is proportional to the square of the blade length. Since the turbine inlet velocity, as result of turbine-intake tower 110, of the system of the present invention is higher than the wind velocity at the inlet of a turbine of a conventional wind turbine system, the turbine system of the present invention has a higher power output than the conventional wind turbine system for the same blade length. This means that since the power output of a turbine is proportional to the cubic order of the turbine inlet velocity and is proportional to the square of the blade length, the turbine of present invention can have shorter blades than the blades of the turbines of conventional wind turbine systems and still have a higher power output. Shorter blades also result in less drag than longer blades and thus result in less energy loss than longer blades.

Shorter blades result in lower material costs, installation costs, and maintenance costs compared to the longer blades of the turbines of conventional wind turbine systems. The shorter blades are less susceptible to defects and failure, take up less space, and generate less noise and vibration than the longer blades of the turbines of conventional wind turbine systems.

Figure 5:
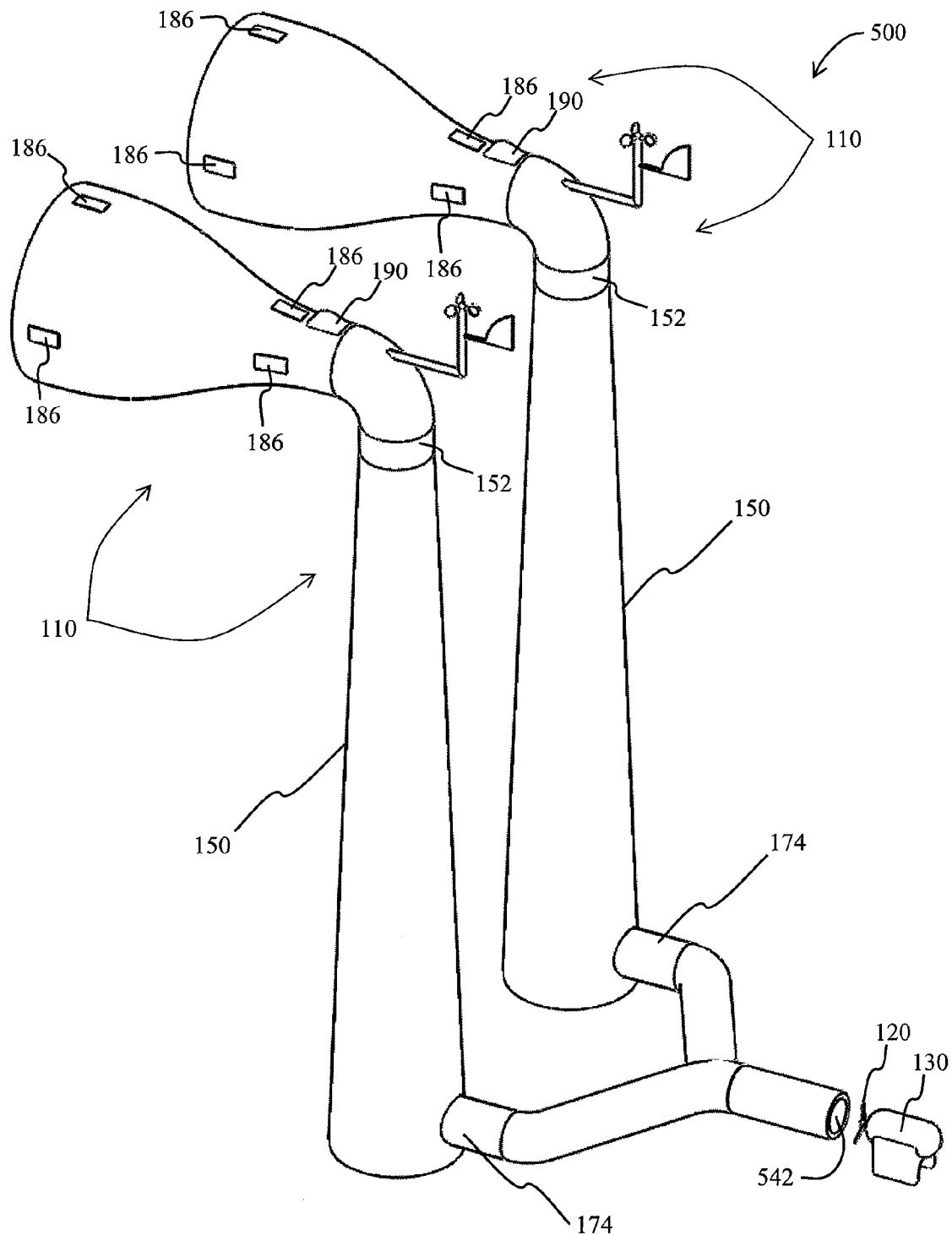
FIG. 5 is a perspective view of another embodiment of a wind energy conversion system, according to another embodiment of the present invention.

Actuators 186, e.g., piezoelectric actuators, may be physically coupled to the outer surface of intake nozzle assembly 143, e.g., the outer surface of intake nozzle 144 and/or the outer surface of collector 146, as shown in FIGS. 1 and 5. For example, actuators 186 may be coupled in direct physical contact with the outer surface of intake nozzle 144 and/or the outer surface of collector 146. Actuators 186 are electrically coupled to a controller 190 for receiving electrical signals from controller 190.

A wind speed sensor, such as an anemometer 192, may be mounted on an outer surface of turbine-intake tower 110 at or near the top of turbine-intake tower 110 for sensing the wind speed. For example, anemometer 192 may be mounted on elbow 164, as shown in FIG. 1, or on intake nozzle assembly 143. Anemometer 192 may be electrically coupled to controller 190 for sending electrical signals to controller 190 indicative of the sensed wind speed. Note that although anemometer 192 is positioned behind inlet 140, anemometer 192 is positioned at a vertical level that is sufficiently above the upper surface of intake nozzle assembly 143 so as to sense the prevailing wind speed external to turbine-intake tower 110. As a result, anemometer 192 effectively measures the prevailing wind speed upstream of inlet 140.

A wind direction sensor, such as a wind vane 194, may be mounted on an outer surface of turbine-intake tower 110 at or near the top of turbine-intake tower 110 for sensing the wind direction. Wind vane 194 catches the wind and rotates intake nozzle assembly 143 relative to support column 150 such that inlet 140 is directed into the wind, e.g., so that central longitudinal axis 156 of intake nozzle assembly 143 is parallel to the wind direction. Wind vane 194 may be electrically coupled to controller 190 for sending electrical signals to controller 190 indicative of the sensed wind direction.

For another embodiment, upon receiving electrical signals from wind vane 194, controller 190 may send electrical signals to a yaw motor (not shown) located adjacent bearing 152. A yaw drive (not shown) may mechanically couple the yaw motor to intake nozzle assembly 143. The signals instruct the yaw motor to activate the yaw drive that in turn rotates intake nozzle assembly 143 such that inlet 140 is directed into the wind.

In response to receiving signals indicative of the wind speed from anemometer 192, controller may send electrical signals to actuators 186. Actuators 186 may then adjust the shape (e.g., contour) of intake nozzle assembly 143 by exerting forces on the outer surface of intake nozzle assembly 143 based on the wind speed. That is, the shape of collector 146 and/or the shape of intake nozzle 144 may be adjusted based on the wind speed. For example, actuators may adjust the diameter of collector 146 and/or a diameter of intake nozzle 144.

Controller 190 may store voltage values corresponding to the voltages that need to be applied to an actuator 186 to set a diameter at a certain numerical value. The certain numerical value may correspond to a diameter that provides a certain increase in velocity and/or reduced losses for a certain wind velocity for a certain power output.

For example, anemometer 192 might detect a wind speed and send a signal indicative of the wind speed to controller 190. Controller 190 may then determine the required velocity at outlet 142 to produce a certain power. Controller 190 may further determine how much voltage needs to be applied to actuator 186 to adjust the diameter of intake nozzle 144 and/or collector 146 in order to produce the required velocity at outlet 142 for the detected wind speed. Similarly, controller 190 may adjust the diameter of collector 146 and/or a diameter of intake nozzle 144 to reduce flow losses based on a detected wind speed.

In the event that anemometer 192 detects a wind speed that is excessive, e.g., above a certain value, and that could cause damage to turbine 120 and/or generator 130, controller 190 might send a signal to solenoid activated bleed-off valves 193 located at the elbows 164 and 172 that causes the bleed-off valves 193 to open. Opening the bleed-off valves 193 causes a portion of the flow to be bled off, reducing the turbine inlet velocity to an acceptable value. For example, a portion of the flow may be bled off between intake nozzle assembly 143 and tower nozzle 170, and a portion of the flow may be bled off between tower nozzle 170 and turbine 120. For one embodiment, the bled-off flows may be directed to another turbine.

After intake nozzle assembly 143 is rotated such that inlet 140 is directed into the wind and central longitudinal axis 156 is substantially parallel to the wind direction, collector 146 collects the wind and directs the wind to intake nozzle 144. Intake nozzle 144 accelerates the wind. Elbow 164 receives the accelerated wind from intake nozzle 143 and directs the wind to tower nozzle 170 by turning the wind by substantially 90 degrees. Tower nozzle 170 further accelerates the wind. For one embodiment, elbow 172 receives the further accelerated wind from tower nozzle 170 and directs the wind to outlet duct 174 by turning the wind by substantially 90 degrees. Outlet duct 174 directs the wind to turbine 120, e.g., when turbine 120 is a horizontal-axis turbine. For another embodiment, e.g., when turbine 120 is a vertical-axis turbine, turbine 120 may receive the wind directly from tower nozzle 170 while the wind is flowing substantially vertically downward.

Figure 3:
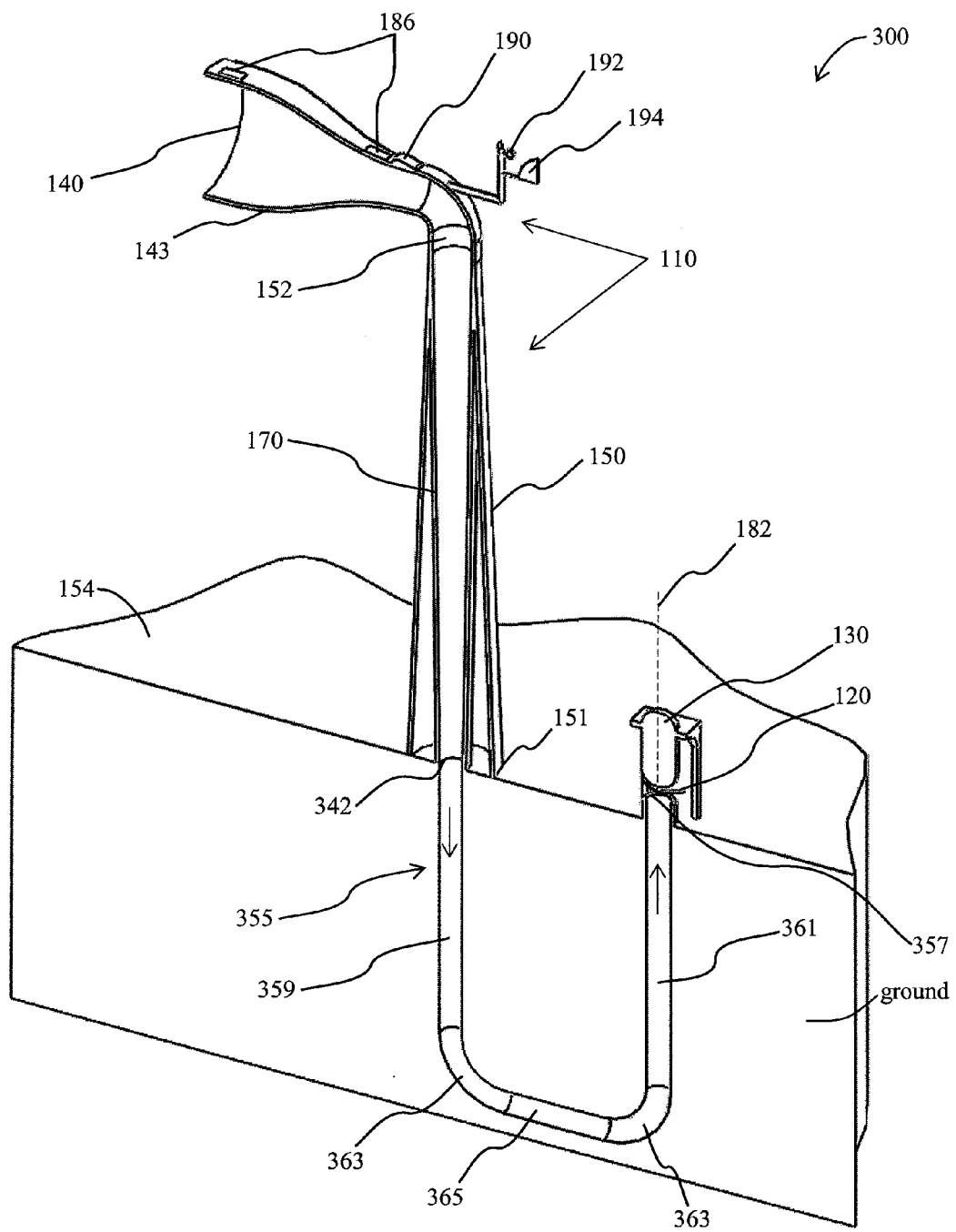
FIG. 3 is a cut-away perspective view of another embodiment of a wind energy conversion system, according to another embodiment of the present invention.

FIG. 3 is a cut-away perspective view of a wind energy conversion system 300. Common numbering is used in FIGS. 1 and 3 to identify components common to FIGS. 1 and 3. The common components are as discussed above in conjunction with FIG. 1.

Wind energy conversion system 300 includes turbine-intake tower 110, turbine 120, and electrical generator 130. An outlet 342 of turbine-intake tower 110 is located at the exit of tower nozzle 170 and is coupled to subterranean plumbing, such as a subterranean flow delivery system 355. Subterranean flow delivery system 355 is fluidly coupled to tower nozzle 170. Subterranean flow delivery system 355 receives the accelerated flow exiting tower nozzle 170, e.g., while the wind is flowing substantially vertically downward, and delivers that flow to turbine 120, which is fluidly coupled to subterranean flow delivery system 355.

Figure 4:
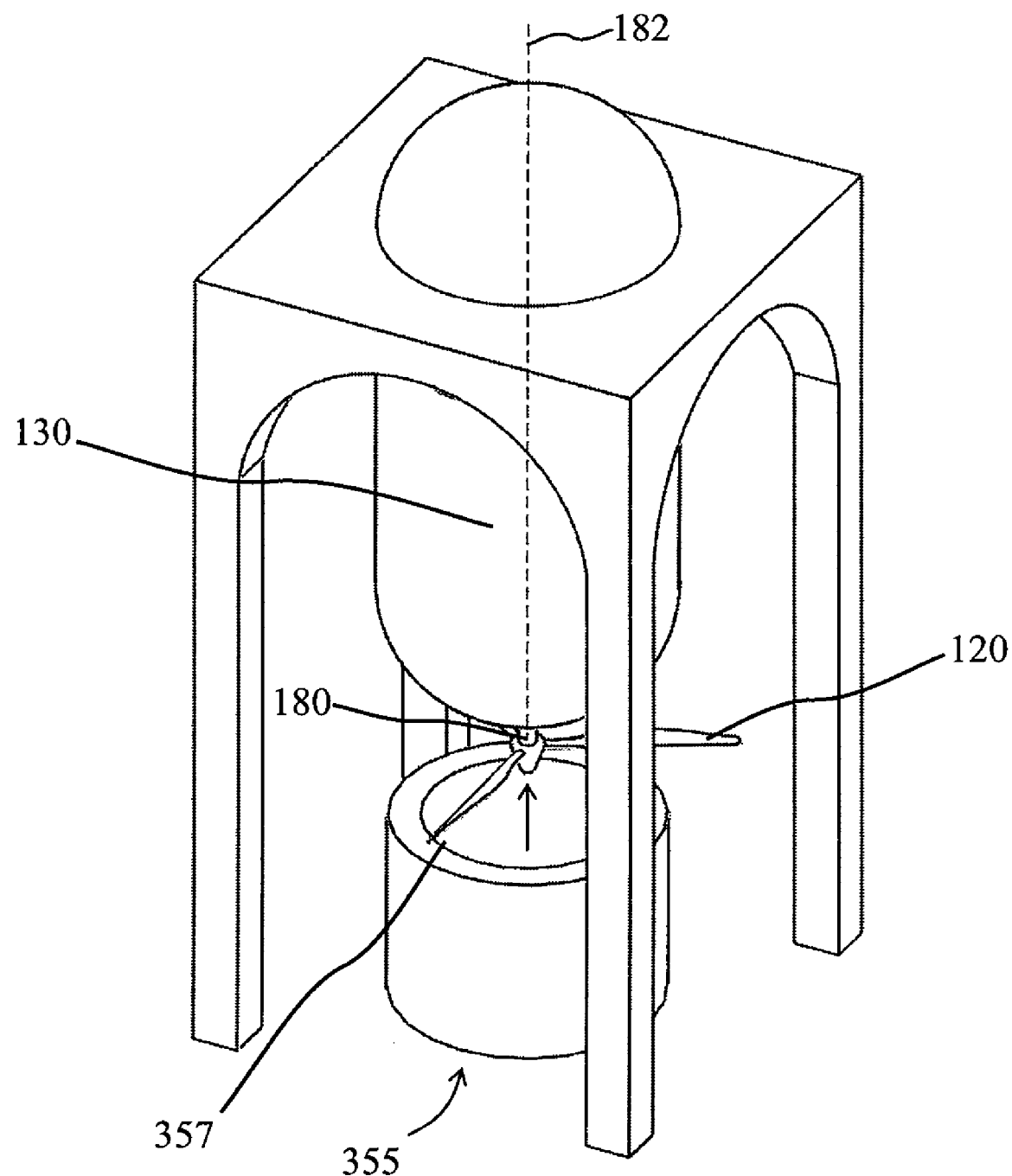
FIG. 4 is an enlarged view of a portion of FIG. 3, according to another embodiment of the present invention.

FIG. 4 is an enlarged view showing the outlet 357 of subterranean flow delivery system 355, turbine 120, and generator 130. Common numbering is used in FIGS. 2 and 4 to identify components common to FIGS. 2 and 4. The common components are as discussed above in conjunction with FIGS. 1 and 2.

The flow velocity at outlet 357 is the turbine inlet velocity. Turbine 120 is oriented so that its shaft 180 that is substantially vertical, i.e., central longitudinal axis 182 of shaft 180 is substantially vertical. For example, turbine 120 may be referred to as a vertical-axis turbine.

Subterranean flow delivery system 355 includes a substantially vertical duct 359 and a substantially vertical duct 361. Ducts 359 and 361 are fluidly coupled by elbows 363 and a substantially horizontal duct 365. Turbulence suppressors may be implemented to reduce turbulence in ducts 359 and 361, elbows 363, and duct 365.

Subterranean flow delivery system 355 acts to increase the velocity of (e.g., accelerate) the flow exiting tower nozzle 170 by taking advantage of the cooler temperatures typically present under ground. The cooler temperatures cause the walls of the subterranean flow delivery system 355 to be at a lower temperature than the temperature of the air (wind) entering turbine-intake tower 110.

For example, the temperature of the wall of duct 359 is lower than the temperature of the air entering turbine-intake tower 110. As a result, the air cools and becomes more dense (e.g., heavier) as it flows downward through duct 359. The difference between the lower density air entering turbine-intake tower 110 and the higher density air in duct 359 produces a pumping effect that accelerates the downward flow through duct 359 (note that cooler air has a natural tendency to flow downward). The pumping effect acts to increase the flow velocity in duct 359 and thus in subterranean flow delivery system 355, meaning that the turbine inlet velocity is increased.

In an alternative embodiment, turbine-intake tower 110, turbine 120, and generator 130 may be located on a platform floating on water, and subterranean flow delivery system 355 may be located under the surface of the water. In this embodiment, subterranean flow delivery system 355 will act to increase the flow velocity in the same way as when subterranean flow delivery system 355 was located under ground, owing to the lower temperatures that typically occur below the surface of water.

For another embodiment, the outputs of two or more turbine-intake towers 110 may be sent to a single turbine 120 coupled to a single generator 130, as shown for a wind energy conversion system 500 in FIG. 5. In particular, the outlet ducts 174 are coupled to a single outlet 542 directed at turbine 120. Note that the flow velocity at outlet 542 is the turbine inlet velocity. Common numbering is used in FIGS. 1 and 5 to identify components common to FIGS. 1 and 5.

For another embodiment, two or more turbine-intake towers 110 may be coupled to a subterranean flow delivery system, such as subterranean flow delivery system 355 (FIG. 3). Alternatively, each of the two or more turbine-intake towers 110 may be respectively coupled to respective ones of two or more subterranean flow delivery systems 355, and each of the subterranean flow delivery systems 355 may be coupled to single outlet 542 of FIG. 5.

Figure 6:
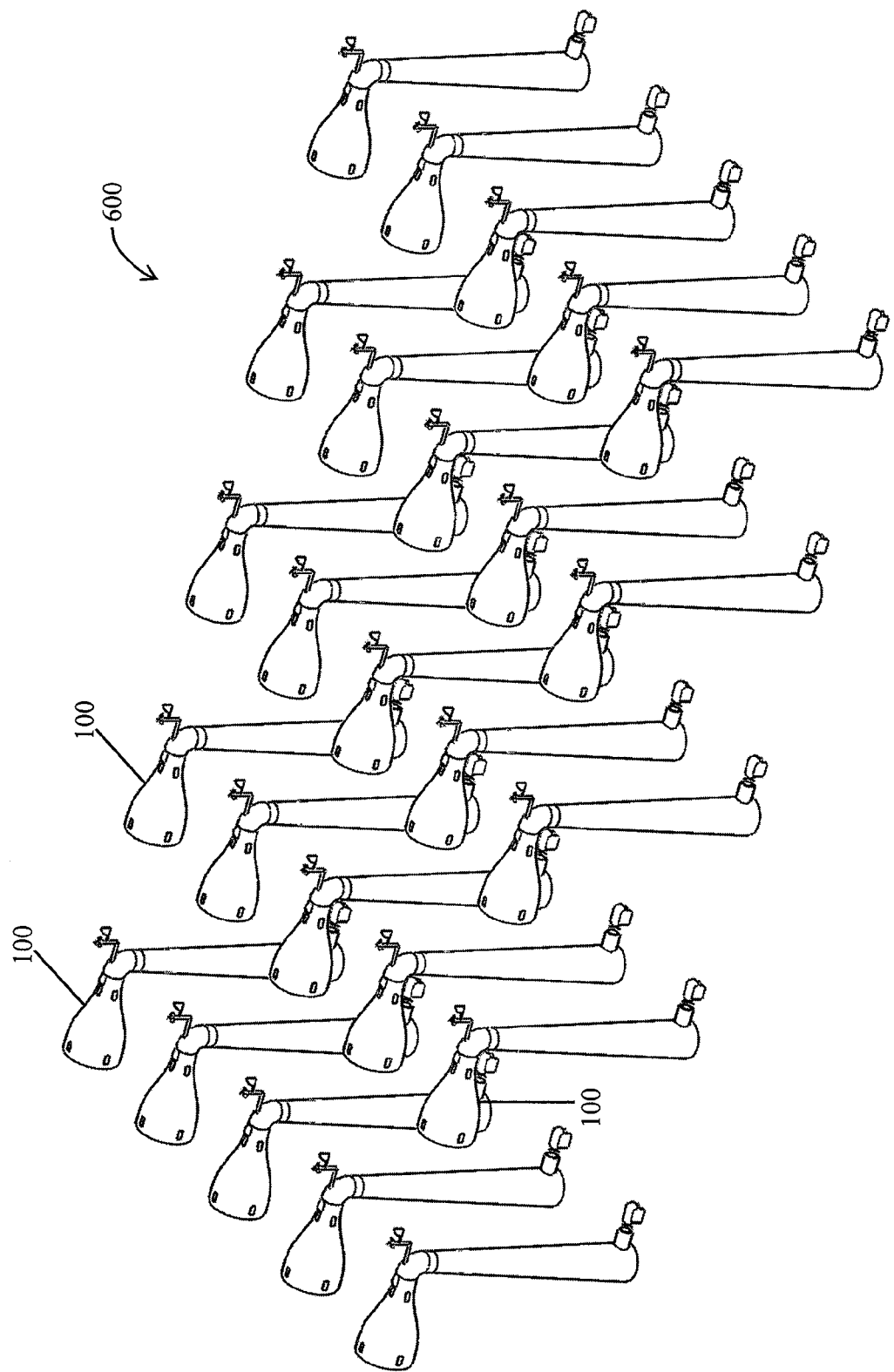
FIG. 6 a perspective view of an embodiment of a wind farm, according to another embodiment of the present invention.

FIG. 6 is a perspective view of a wind farm 600. For one embodiment, wind farm 600 may include a plurality of wind energy conversion systems 100, as described above in conjunction with FIGS. 1 and 2. Alternatively, a wind farm may include a plurality of wind energy conversion systems 300 having turbine-intake towers 110 coupled to subterranean plumbing, as described above in conjunction with FIGS. 3 and 4. In another embodiment, a wind farm may include a plurality of turbine-intake towers 110 coupled to a single outlet directed at a single turbine, as shown in FIG. 5.

In the disclosed embodiments, the turbine and generator are located at or near ground level and are easier to access than the turbine and generator installed on the top of a tower in conventional wind power systems. This acts to reduce maintenance costs and noise and vibration. The noise and vibration often results in damage to conventional wind power systems and their supporting structures, thereby inducing failure. In addition, reducing the length of the turbine blades, as described above, reduces the initial capital cost, installation cost, and the lifetime maintenance cost of the turbine.

The disclosed embodiments allow for centralizing the wind power generation farms and thus increase efficiency and reduce cost. Centralization of the wind power generation will also make the implementation in the national grid much easier.

The disclosed embodiments can be implemented as single units for single households. A single unit may also be installed on rooftop, large ships, and other moving (e.g. automobiles) or still systems. The disclosed embodiments can also be implemented in groups in any number that suits the power requirements. The disclosed embodiments can be implemented in commercial wind power generation farms installed on land or offshore.

For one embodiment, a method of delivering wind to a turbine includes accelerating the wind within a first nozzle facing into the wind and oriented substantially parallel to a direction of the wind, further accelerating the wind within a second nozzle that is substantially perpendicular to the first nozzle, adjusting a shape of the first nozzle using one or more actuators coupled in direct physical contact with an outer surface of the first nozzle, where adjusting the shape of the first nozzle using the one or more actuators includes the one or more actuators exerting forces on the outer surface of the first nozzle in response to the one or more actuators receiving electrical signals from a controller electrically coupled to the one or more actuators, and after accelerating the wind in the second nozzle, directing the wind onto blades of the turbine.

In a further embodiment of the method, the electrical signals received by the one or more actuators from the controller are based on a wind speed.

In a further embodiment, before accelerating the wind within the first nozzle, the method further includes collecting the wind in a collector and directing the wind to the first nozzle from the collector. In a further embodiment, the method further includes adjusting a shape of the collector using one or more actuators coupled in direct physical contact with an outer surface of the collector, where adjusting the shape of the collector using those one or more actuators includes those one or more actuators exerting forces on the outer surface of the collector in response to those one or more actuators receiving electrical signals from the controller.

In a further embodiment, the method further includes bleeding off a portion of the wind between the first and second nozzles and/or between the second nozzle and the turbine and directing the bled-off wind to another turbine.

CONCLUSION

Although specific embodiments have been illustrated and described herein it is manifestly intended that the scope of the claimed subject matter be limited only by the following claims and equivalents thereof.

What is claimed is:

1. A turbine-intake tower for delivering wind to a turbine, the turbine-intake tower comprising:
    a hollow support column;
    an intake nozzle assembly rotatably coupled to the support column;
    a tower nozzle disposed within the support column;
    a controller; and
    one or more actuators coupled in direct physical contact with an outer surface of the intake nozzle assembly and electrically coupled to the controller, wherein the one or more actuators are configured to receive electrical signals from the controller, wherein the one or more actuators are configured to exert forces on the outer surface of the intake nozzle assembly in response to receiving the electrical signals from the controller, wherein the forces exerted on the outer surface of the intake nozzle assembly by the one or more actuators in response to receiving the electrical signals from the controller change a shape of the intake nozzle assembly;
    wherein the intake nozzle assembly is configured to receive and to accelerate the wind; and
    wherein the tower nozzle is configured to receive the wind from the intake nozzle assembly and to further accelerate the wind received from the intake nozzle assembly for delivery to the turbine.

2. The turbine-intake tower of claim 1, wherein the intake nozzle assembly comprises a collector and an integral converging nozzle.

3. The turbine-intake tower of claim 2, wherein a flow passage within the collector is substantially uniform in size.

4. The turbine-intake tower of claim 1, further comprising a subterranean flow delivery system interposed between the tower nozzle and the turbine and fluidly coupling the tower nozzle to the turbine, the subterranean flow delivery system configured to receive the wind from the tower nozzle and to accelerate the wind received from the tower nozzle, wherein the wind from the tower nozzle is accelerated within the subterranean flow delivery system by a difference in temperature between wind entering the intake nozzle assembly and the wind in the subterranean flow delivery system.

5. The turbine-intake tower of claim 1, wherein the one or more actuators are piezoelectric actuators.

6. The turbine-intake tower of claim 1, further comprising a wind speed sensor electrically coupled to the controller for sensing a wind speed and sending electrical signals to the controller indicative of the wind speed.

7. The turbine-intake tower of claim 1, wherein the electrical signals received at the one or more actuators from the controller are based on wind speed.

8. The turbine-intake tower of claim 1, wherein a base of the support column is configured to contact the ground or a platform floating on water and wherein the turbine is located adjacent the base.

9. The turbine-intake tower of claim 1, further comprising a bleed-off valve between the intake nozzle assembly and the tower nozzle for bleeding off wind and directing that bled-off wind to another turbine and/or further comprising a bleed-off valve between the tower nozzle and the turbine for bleeding off wind and directing that bled-off wind to another turbine.

10. The turbine-intake tower of claim 2, wherein the one or more actuators coupled in direct physical contact with an outer surface of the intake nozzle assembly comprise one or more first actuators coupled in direct physical contact with an outer surface of the collector and one or more second actuators coupled in direct physical contact with an outer surface of the integral converging nozzle.

11. A wind energy conversion system, comprising:
    a turbine;
    a generator coupled to the turbine; and
    one or more turbine-intake towers, each turbine intake tower comprising:
        a substantially horizontal intake nozzle assembly located at a vertical level above a base of the turbine-intake tower;
        a substantially vertical tower nozzle fluidly coupled to the intake nozzle assembly and the turbine and extending substantially vertically between the intake nozzle assembly and the turbine;
        a controller; and
        one or more piezoelectric actuators coupled in direct physical contact with an outer surface of the intake nozzle assembly and electrically coupled to the controller, wherein the one or more piezoelectric actuators are configured to receive electrical signals from the controller that cause the one or more piezoelectric actuators to exert forces on the outer surface of the intake nozzle assembly that change a shape of the intake nozzle assembly.

12. The wind energy conversion system of claim 11, further comprising;
    a hollow support column;
    wherein the intake nozzle assembly is rotatably coupled to the hollow support column; and
    wherein the tower nozzle is disposed within the hollow support column.

13. The wind energy conversion system of claim 11, wherein the intake nozzle assembly comprises a collector and an integral converging nozzle, wherein a flow passage within the collector is substantially uniform in size.

14. The wind energy conversion system of claim 11, further comprising a subterranean flow delivery system interposed between the tower nozzle and the turbine and fluidly coupling the tower nozzle to the turbine.

15. The wind energy conversion system of claim 11, wherein the wind energy conversion system is part of a wind farm comprising a plurality of the wind energy conversion systems.

16. A method of delivering wind to a turbine, comprising:

accelerating the wind within a first nozzle facing into the wind and oriented substantially parallel to a direction of the wind;

further accelerating the wind within a second nozzle that is substantially perpendicular to the first nozzle;

adjusting a shape of the first nozzle using one or more actuators coupled in direct physical contact with an outer surface of the first nozzle, wherein adjusting the shape of the first nozzle using the one or more actuators comprises the one or more actuators exerting forces on the outer surface of the first nozzle in response to the one or more actuators receiving electrical signals from a controller electrically coupled to the one or more actuators; and after accelerating the wind in the second nozzle, directing the wind onto blades of the turbine.

17. The method of claim 16, wherein the electrical signals received by the one or more actuators from the controller are based on wind speed.

18. The method of claim 16, further comprising, before accelerating the wind within the first nozzle:

collecting the wind in a collector; and directing the wind to the first nozzle from the collector.

19. The method of claim 18, wherein the one or more actuators are one or more first actuators, and further comprising adjusting a shape of the collector using one or more second actuators coupled in direct physical contact with an outer surface of the collector, wherein adjusting the shape of the collector using the one or more second actuators comprises the one or more second actuators exerting forces on the outer surface of the collector in response to the one or more second actuators receiving electrical signals from the controller.

20. The method of claim 16, further comprising bleeding off a portion of the wind between the first and second nozzles and/or between the second nozzle and the turbine and directing the bled-off wind to another turbine.

\* \* \* \* \*